US012142719B2

(12) United States Patent
Shin et al.

(10) Patent No.: US 12,142,719 B2
(45) Date of Patent: Nov. 12, 2024

(54) ELECTRODE PLATE STACKING APPARATUS OF PRISMATIC SECONDARY BATTERY USING VACUUM BELT CONVEYOR, AND VACUUM BELT CONVEYOR HAVING SELF-ALIGNMENT FUNCTION

(71) Applicant: INNOMETRY CO., LTD., Anyang-Si (KR)

(72) Inventors: Hyuk Shin, Hwaseong-si (KR); Nam Hyeong Hong, Hwaseong-si (KR); Cheol Won Yeom, Osan-si (KR)

(73) Assignees: Hyuk Shin, Hwaseong-si (KR); INNOMETRY CO., LTD., Anyang-si (KR)

( * ) Notice: Subject to any disclaimer, the term of this patent is extended or adjusted under 35 U.S.C. 154(b) by 389 days.

(21) Appl. No.: 17/287,720

(22) PCT Filed: Oct. 25, 2019

(86) PCT No.: PCT/KR2019/014122
§ 371 (c)(1),
(2) Date: Aug. 5, 2021

(87) PCT Pub. No.: WO2020/085835
PCT Pub. Date: Apr. 30, 2020

(65) Prior Publication Data
US 2022/0278349 A1    Sep. 1, 2022

(30) Foreign Application Priority Data

Oct. 25, 2018 (KR) .................. 10-2018-0128571
Jul. 16, 2019 (KR) .................. 10-2019-0085718

(51) Int. Cl.
*H01M 10/04* (2006.01)
*B65G 15/58* (2006.01)

(52) U.S. Cl.
CPC ........ *H01M 10/0404* (2013.01); *B65G 15/58* (2013.01)

(58) Field of Classification Search
CPC .. H01M 10/0404; H01M 10/04; H01M 10/14; B65G 15/58
See application file for complete search history.

(56) References Cited

U.S. PATENT DOCUMENTS

| 6,021,887 A * | 2/2000 | Redden ................. H01M 10/14 198/463.4 |
| 2015/0090389 A1* | 4/2015 | Min .................. H01M 10/0404 156/60 |
| 2019/0036149 A1* | 1/2019 | Sakurai ................. H01M 50/46 |

FOREIGN PATENT DOCUMENTS

| JP | 5522851 B2 | 6/2014 |
| KR | 10-1433554 B1 | 8/2014 |

(Continued)

OTHER PUBLICATIONS

International Search Report for PCT/KR2019/014122 dated Feb. 10, 2020.

*Primary Examiner* — Sadie White
*Assistant Examiner* — Kayla Elaine Clary
(74) *Attorney, Agent, or Firm* — MOSER TABOA (57) ABSTRACT

An electrode plate stacking apparatus for a prismatic secondary battery is provided. The present invention provides an electrode plate stacking apparatus for a prismatic secondary battery, wherein a positive electrode plate and a negative electrode plate are supplied alternately on a stack base and a separator is provided between the positive electrode plate and the negative electrode plate, the apparatus comprising, a vacuum belt conveyor for moving electrode plates along a transfer line, a first swing unit capable of performing a swing motion about an axis parallel to a horizontal plane, configured to unload an electrode plate (Continued)

from the vacuum belt conveyor and load it onto the stack base, wherein one of the vacuum belt conveyor and the stack base is configured to be inclined with respect to the horizontal plane to allow the first swing unit to load or unload the electrode plate at both ends of the swing motion, and an electrode plate alignment unit configured to align an electrode plate on the vacuum belt conveyor by adjusting position of the vacuum belt conveyor.

7 Claims, 8 Drawing Sheets

(56) References Cited

FOREIGN PATENT DOCUMENTS

| | | |
|---|---|---|
| KR | 10-2015-0111551 A | 10/2015 |
| KR | 10-1730469 B1 | 4/2017 |
| KR | 10-2018-0013640 A | 2/2018 |
| WO | WO-2017131027 A1 * | 8/2017 ............. H01G 11/86 |

* cited by examiner

ELECTRODE PLATE STACKING APPARATUS OF PRISMATIC SECONDARY BATTERY USING VACUUM BELT CONVEYOR, AND VACUUM BELT CONVEYOR HAVING SELF-ALIGNMENT FUNCTION

TECHNICAL FIELD

The present invention relates to an apparatus for manufacturing a cell of a prismatic secondary battery, and more particularly, to an apparatus for manufacturing a cell stack in which negative electrode plates and positive electrode plates are alternately placed on separators.

BACKGROUND

In general, a chemical cell is composed of a pair of electrodes, i.e., a positive electrode plate and a negative electrode plate, and electrolyte. The amount of energy that can be stored in a chemical cell varies depending on the material contained in the electrode and the electrolyte. The chemical cells are classified into primary batteries used only for one-time discharge due to a very slow charging reaction and secondary batteries that can be reused through repetitive charging and discharging. Recently, the use of secondary batteries is increasing due to the advantage of charging and discharging.

Due to its advantages, secondary batteries have been applied to various technical fields throughout the industry, and are widely used as energy sources of mobile communication devices such as smart phones, and are attracting attention as energy sources of electric vehicles.

The secondary battery is manufactured in a form in which a positive electrode plate, a separator, and a negative electrode plate are sequentially stacked to be immersed in electrolyte. There are two main methods of manufacturing an inner cell stack of the secondary battery.

In the case of a small secondary battery, a method of arranging a negative electrode plate and a positive electrode plate on a separator and winding them in a jelly-roll form is widely used, whereas in the case of a medium and large secondary battery having more electric capacity, a method of arranging a negative electrode plate and a positive electrode plate by stacking them in a proper order with a separator is widely used. Particularly, in the stacking method, electrode plates obtained by blanking are mainly used, and thus the battery has excellent performance due to a relatively large space through which the electrolyte solution penetrates between the edges of the electrode plates and the separator.

In the zigzag-type (also referred to as a 'z-folding' type) stacking method widely used among the methods of manufacturing a secondary battery cell stack in a stacking manner, the separator forms a zigzag folded shape, and the negative electrode plates and the positive electrode plates are alternately stacked in an inserted form.

In the zigzag-type stacking method, the manufacturing speed of a cell stack is determined by the sum of the time spent on the various stages such as the time to fetch the electrode plates from the magazine, the time to align the electrode plates, the time to stack the aligned electrode plates on the stack base, and the time to alternately stack the negative and positive electrode plates. Therefore, efforts have been made to shorten the working time for each stage.

Korean Registered Patent No. 10-1730469 (published on Apr. 27, 2017) describes a cell stack manufacturing apparatus on which the electrode plates stored in a magazine are transferred by a loading picker with an articulated connection structure to an alignment table where they are aligned, and then stacked on a stack base using a rotary transfer picker.

According to the disclosure, an electrode plate is first transferred from the magazine to the alignment table, and then from the alignment table to the stack base. However, due to the different delivery mechanisms used for the transfers and the long return time of the loading picker, there is a limit to shortening the delivery time from the magazine to the stack base.

Korean Registered Patent No. 10-1662179 (published on Oct. 11, 2016) describes an apparatus comprising a suction conveyor and an intermittently-rotating body with a plurality of pick-up arms arranged radially to prevent more than one electrode plates from being lifted together when an electrode plate is lifted from electrode plate magazine. When the transfer of an electrode plate is initiated by rotating a motor having a rotating shaft coupled to the center of the intermittently-rotating body by 90 degrees, the rotational inertia ensures that only one electrode plate remains on the pick-up arm and allows it to be attached to the bottom of the suction conveyor. Thereafter, the electrode plate is moved from the bottom of the suction conveyor to the upper side by the orbital movement of the suction conveyor, and it is transferred to the next process by a pick-up means such as an suction pad.

According to this configuration, after picking up the electrode plate from the suction conveyor, it is necessary to transfer it to the stack base through an alignment step on an alignment table, so it has nothing to do with shortening the delivery time of the electrode plate.

As described above, the manufacturing speed of the cell stack is a matter of how quickly the electrode plate is moved from the magazine loaded with the electrode plates to the stack base where the cell stack is stacked, so it is required that the delivery path of the electrode plate is short, the delivery method is common, and the return operation is simple. However, no prior art provided such a method or apparatus.

DETAILED DESCRIPTION OF THE INVENTION

Technical Object

An object of the present invention is to provide an electrode plate stacking apparatus for a prismatic secondary battery capable of quickly and stably transferring an electrode plate from a magazine in which electrode plates are stored to a stack base stacking the plate.

Another object of the present invention is to provide an electrode plate stacking apparatus for a prismatic secondary battery in which the time required for return of the devices involved in delivering the electrode plate is unnecessary or shortened to a minimum.

Another object of the present invention is to provide an electrode plate stacking apparatus for a prismatic secondary battery in which the same electrode plate transfer mechanism is employed in two or more electrode plate transfer stages.

Another object of the present invention is to provide an electrode plate stacking apparatus for a prismatic secondary battery having a stack base capable of moving in a manner in which the stack plates are stably stacked while the movement speed of the stack base is maximized.

Another object of the present invention is to provide an electrode plate conveying means having an electrode plate alignment function by itself.

Technical Solution

An electrode plate stacking apparatus for a prismatic secondary battery according to the present invention for achieving the above objects includes the following aspects and any combinations thereof.

In one aspect of the present invention, an electrode plate stacking apparatus for a prismatic secondary battery, wherein a positive electrode plate and a negative electrode plate are supplied alternately on a stack base and a separator is provided between the positive electrode plate and the negative electrode plate, comprises a vacuum belt conveyor for moving electrode plates along a transfer line, a first swing unit capable of performing a swing motion about an axis parallel to a horizontal plane, configured to unload an electrode plate from the vacuum belt conveyor and load it onto the stack base, wherein one of the vacuum belt conveyor and the stack base is configured to be inclined with respect to the horizontal plane to allow the first swing unit to load or unload the electrode plate at both ends of the swing motion, and an electrode plate alignment unit configured to align an electrode plate on the vacuum belt conveyor by adjusting position of the vacuum belt conveyor.

According to another aspect of the present invention, the electrode plate stacking apparatus further comprises a second swing unit capable of performing a swing motion about an axis that is the same or parallel to the axis of the first swing unit, and the second swing unit is configured to unload an electrode plate from an electrode plate magazine and load it onto the vacuum belt conveyor.

According to another aspect of the present invention, the vacuum belt conveyor is a single vacuum belt conveyor or a plurality of vacuum belt conveyors which are extending along the transfer line and extending at least from the magazine to the stack base.

According to another aspect of the present invention, the electrode plate alignment unit includes an XYθ-moving module configured to adjust the position of the vacuum belt conveyor.

According to another aspect of the present invention, the electrode plate alignment unit includes an electrode plate position recognition module.

According to another aspect of the present invention, the vacuum belt conveyor includes a first vacuum belt conveyor and a second vacuum belt conveyor arranged in a line along the transfer line, the first swing unit being capable of performing a swing motion between the first vacuum belt conveyor and the stack base, the second swing unit being capable of performing a swing motion between the second vacuum conveyor and the magazine.

According to another aspect of the present invention, the first and second belt conveyors repeat a transfer operation and a stop operation, and are operable in synchronization with each other.

According to another aspect of the present invention, the apparatus further comprises a moving means for moving the stack base, and the moving means is capable of moving the stack base in a U-shaped trajectory.

According to another aspect of the present invention, the apparatus further comprises a moving means for moving the stack base, and the moving means is capable of moving the stack base in a lower semicircular trajectory.

According to another aspect of the present invention, an electrode plate stacking apparatus for a prismatic secondary battery, wherein a positive electrode plate and a negative electrode plate are supplied alternately on a stack base and a separator is provided between the positive electrode plate and the negative electrode plate, comprises a vacuum belt conveyor for moving electrode plates along a transfer line, a first swing unit capable of performing a swing motion about an axis parallel to a horizontal plane, configured to unload an electrode plate from the vacuum belt conveyor and load it onto the stack base, wherein the vacuum belt conveyor is configured to be inclined with respect to the horizontal plane to allow the first swing unit to load or unload the electrode plate at both ends of the swing motion.

According to another aspect of the present invention, the apparatus further comprises a second swing unit capable of performing a swing motion about an axis that is the same or parallel to the axis of the first swing unit, and the second swing unit is configured to unload an electrode plate from an electrode plate magazine and load it onto the vacuum belt conveyor.

According to another aspect of the present invention, the vacuum belt conveyor is a single vacuum belt conveyor or a plurality of vacuum belt conveyors which are extending along the transfer line and extending at least from the magazine to the stack base.

According to another aspect of the present invention, the apparatus further comprises an electrode plate alignment unit configured to align an electrode plate on the vacuum belt conveyor by adjusting position of the vacuum belt conveyor.

According to another aspect of the present invention, the electrode plate alignment unit includes an XYθ-moving module configured to adjust the position of the vacuum belt conveyor.

According to another aspect of the present invention, the electrode plate alignment unit includes an electrode plate position recognition module.

According to another aspect of the present invention, the vacuum belt conveyor includes a first vacuum belt conveyor and a second vacuum belt conveyor arranged in a line along the transfer line, the first swing unit being capable of performing a swing motion between the first vacuum belt conveyor and the stack base, the second swing unit being capable of performing a swing motion between the second vacuum conveyor and the magazine.

According to another aspect of the present invention, the first and second belt conveyors repeat a transfer operation and a stop operation, and are operable in synchronization with each other.

According to another aspect of the present invention, the apparatus further comprises a moving means for moving the stack base, and the moving means is capable of moving the stack base in a U-shaped trajectory.

According to another aspect of the present invention, the apparatus further comprises a moving means for moving the stack base, and the moving means is capable of moving the stack base in a lower semicircular trajectory.

A vacuum belt conveyor with self-aligning function according to the present invention for achieving the above objects includes the following aspects and any combinations thereof.

According to one aspect of the present invention, a vacuum belt conveyor for an electrode plate stacking apparatus for a prismatic secondary battery, configured to transfer electrode plates along a transfer line, the vacuum belt conveyor comprises an electrode plate alignment unit configured to align an electrode plate on the vacuum belt conveyor by adjusting position of the vacuum belt conveyor itself on which the electrode plate to be transferred are placed, without installing a separate alignment table to align the electrode plate.

According to another aspect of the present invention, the electrode plate alignment unit includes an XYθ-moving module configured to adjust the position of the vacuum belt conveyor.

According to another aspect of the present invention, the electrode plate alignment unit includes an electrode plate position recognition module.

According to another aspect of the present invention, the vacuum belt conveyor is configured to be inclined with respect to a horizontal plane.

According to another aspect of the present invention, a surface of the vacuum belt conveyor is inclined in a direction transverse to a belt running direction.

Effect of the Invention

According to the present invention, the manufacturing speed of the cell stack for a prismatic secondary battery is shortened. Therefore, the production amount of the cell stack per unit time is increased, and the number of production equipment can be reduced.

Since the production process of the cell stack for prismatic secondary batteries requires a significant cost for maintenance of fine dust, temperature, humidity, etc., the cost can be reduced due to the reduction in space occupied by production equipment.

The effects of the present invention are not limited to the effects mentioned above, and other effects not mentioned will be clearly understood by those skilled in the art from the following description.

EMBODIMENTS OF THE INVENTION

The embodiments illustrated in the accompanying drawings are for a clear understanding of the present invention, and the present invention is not limited thereto. In the following description, components having the same reference numerals in different drawings have similar functions, and are not described repeatedly unless necessary for understanding of the invention, and well-known components are briefly described or omitted, but It should not be understood as being excluded from the embodiments of the present invention.

In the present invention, the expression "connected" includes a state where two elements are physically connected as well as a state where two elements are operatively connected, and includes direct connection as well as indirect connection.

In the zigzag-type stacking method of the prismatic secondary battery, the stack base on which the electrode plates are stacked may reciprocate between the position where the negative electrode plates are stacked and the position where the positive electrode plates are stacked. Alternatively, a separator supply section may reciprocates left and right over a stationary stack base.

In this case, whenever the stack base or the separator supply unit moves once between both positions, the separator is configured to be covered over the electrode plate stacked on the stack base. Therefore, a newly stacked electrode plate is always placed on the separator, and when the stack base is subsequently moved, the separator is covered over the just stacked electrode plate. A method for quickly and stably moving the stack base that can be used in the present invention will be described later.

Hereinafter, embodiments of an electrode plate stacking apparatus for a prismatic secondary battery according to the present invention will be described in detail with reference to the accompanying drawings.

Figure 1:
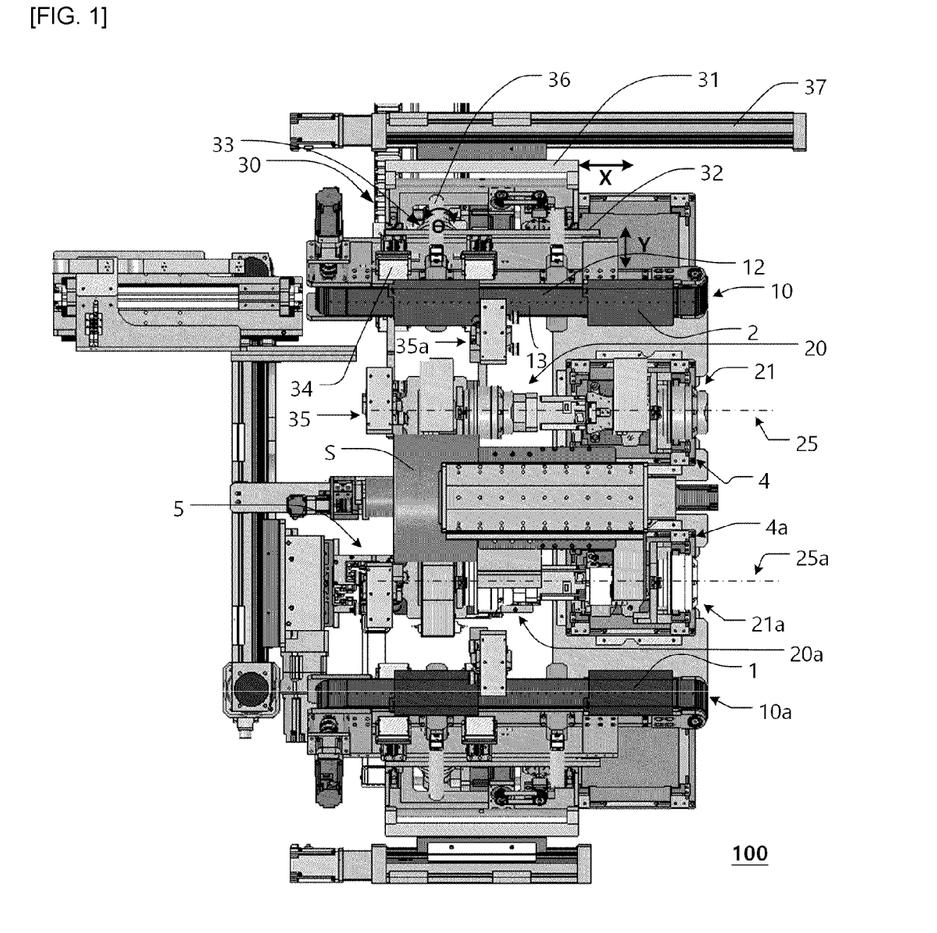
FIG. 1 is a plan view of an electrode plate stacking apparatus according to an embodiment of the present invention.
Figure 2:
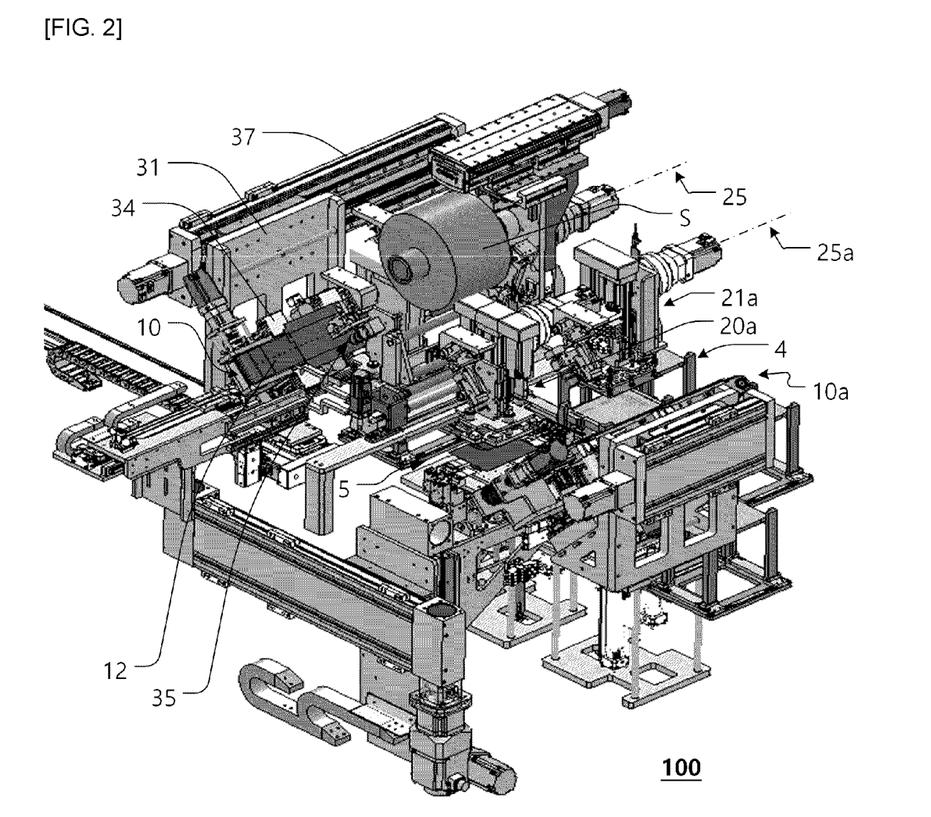
FIG. 2 is a perspective view of an electrode plate stacking apparatus according to an embodiment of the present invention.

Referring to FIGS. 1 and 2, the electrode plate stacking apparatus 100 comprises a vacuum belt conveyor 10,10*a* for transporting negative electrode plates 1 and positive electrode plates 2, on both sides of the separator S which are below and above the separator S in the FIG. 1, respectively, magazines 4 and 4*a* in which the electrode plates 1, 2 are loaded, and a stack base 5 on which the electrode plates 1, 2 are stacked. In this embodiment, the stack base 5 is of a type that reciprocates between the stack position of the negative electrode plate 1 and the stack position of the positive electrode plate 2. Each of the vacuum belt conveyors 10, 10*a* is installed such that the belt traveling directions match the transfer lines of the positive electrode plate 2 and the negative electrode plate 1.

The vacuum belt conveyors 10, 10*a* can transfer the electrode plates 1 and 2, with the electrode plates 1, 2 adhered to the belt surface 12 by suction force applied through a plurality of vacuum holes 13 arranged at regular intervals on the belt surface 12. The 'belt conveyor' is a type of continuous conveying machine, and refers to a device that continuously transports objects by placing an object thereon while driving an annular belt between the belt pulleys. The term 'vacuum' was used to refer to a mechanism that operates to draw material or objects in the vicinity of its inlet by generating an air suction force through the inlet. In this disclosure, generating an air suction force at the inlet is also referred to as applying vacuum at the inlet.

The electrode stacking apparatus comprises first swing units 20, 20*a* for picking up (unloading) the electrode plates 1, 2 from the vacuum belt conveyors 10, 10*a* and supplying (loading) them to the stack base 5, and second swing units 21, 21a for picking up the electrode plates 1, 2 at magazines 4, 4a and transferring them to the vacuum belt conveyors 10, 10a. The swing units 20, 21 for the transfer line for the positive electrode plate 2 can perform swing motions about the swing axis 25, and the swing units 20a, 21a for the transfer line for the negative electrode plate 1 can perform swing motions about the swing axis 25a (as shown by the double-headed arrow in FIG. 3). If the length or extension range of the first swing unit 20, 20a and the second swing unit 21, 21a needs to be configured differently, the swing axes may be configured to be parallel to each other even if they are not the same.

On the opposite side of the swing axis of each swing unit, a pad 22, 23 (see FIG. 3) capable of drawing the electrode plate 1, 2 is provided to load or unload the electrode plate. The suction pads 22, 23 are configured to be movable perpendicular to suction surfaces of the pads 22, 23 so as to extend away from or retract toward the swing axes 25, 25a.

The vacuum belt conveyor 10, 10a is inclined so that the belt surface 12 can be parallel with the surfaces of the suction pad 22, 23 of the swing unit 20, 21; 20a, 21a. That is, the belt surface 12 is arranged to be inclined in a direction transverse to the belt traveling direction with respect to the horizontal plane. With this configuration, loading or unloading of the electrode plate 1, 2 can be performed at one end of a swing motion of the swing units 20, 21; 20a, 21a, with the suction pad 22 of the swing unit being substantially parallel with the belt surface 12 of the vacuum belt conveyor 10, 10a (see FIG. 3).

The electrode stacking apparatus 100 includes an electrode plate aligning unit 30 for aligning the electrode plate immediately before being stacked on the stack base 5. The electrode plate alignment unit 30 includes an XYθ moving module connected to the vacuum belt conveyor 10, 10a. By the operation of the module, the vacuum belt conveyor 10, 10a is movable in the XYθ direction. In this embodiment, the apparatus includes a support frame 31 movable 37 together with the vacuum belt conveyor 10, 10a in the X direction along a guide rail, a support plate 32 movable with the vacuum belt conveyor 10, 10a in the Y direction, a shaft 33 movable with the vacuum belt conveyor 10, 10a in the θ direction and an actuator for movement in each direction of XYθ. The shaft 33 is partially exposed below a hose 36. Each of XYθ directions is shown in FIG. 1, where the Y direction is parallel to the belt surface 12 and θ is a rotational direction.

The electrode plate alignment unit 30 may further include an electrode plate position recognition module including camera 35, 35a and corresponding backlight 34. The XYθ movement module makes necessary movements until the electrode plate is recognized as being in a correct position according to the electrode plate position recognition module. Recognition of the correct position of the electrode plate can be achieved by detecting the position of the edge or the electrode tab of the electrode plate. To this end, a backlight and a camera can be used. In FIG. 1, a total of four backlights (one for each edge of the electrode plate) and two cameras 35 and 35a are used. However, it would also be possible to use two backlights diagonally, or to use one large backlight and a camera(s) correspondingly.

Figure 3:
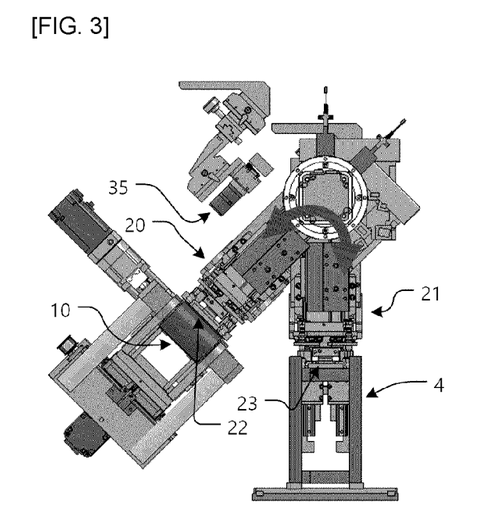
FIG. 3 is a front view of a vacuum belt conveyor and a swing unit according to an embodiment of the present invention.

FIG. 3 is a front view of the vacuum belt conveyor 10 and the swing unit 20, 21 according to an embodiment of the present invention.

The first swing unit 20 performs a swing motion as indicated by the double-headed arrow in FIG. 3, and is configured to perform a swing motion between both ends, i.e., one end facing the vacuum belt conveyor 10 (the position shown in FIG. 3) and the other end facing the stack base 5 (not shown in FIG. 3). Likewise, the second swing unit 21 is configured to perform a swing motion between one end facing the vacuum belt conveyor 10 and the other end facing the magazine 4 (the position shown in FIG. 3).

FIG. 3 illustrates a state in which the suction pad 22 of the first swing unit 20 is to draw an electrode plate on the surface of the vacuum belt conveyor 10 and the suction pad 23 of the second swing unit 21 is to draw an electrode plate in the magazine 4. In order for the swing units 20, 21 to draw and transport the electrode plates, the suction pads 22, 23 can be extended away from or contracted towards the center of the swing motion by a suitable actuator.

Figure 5:
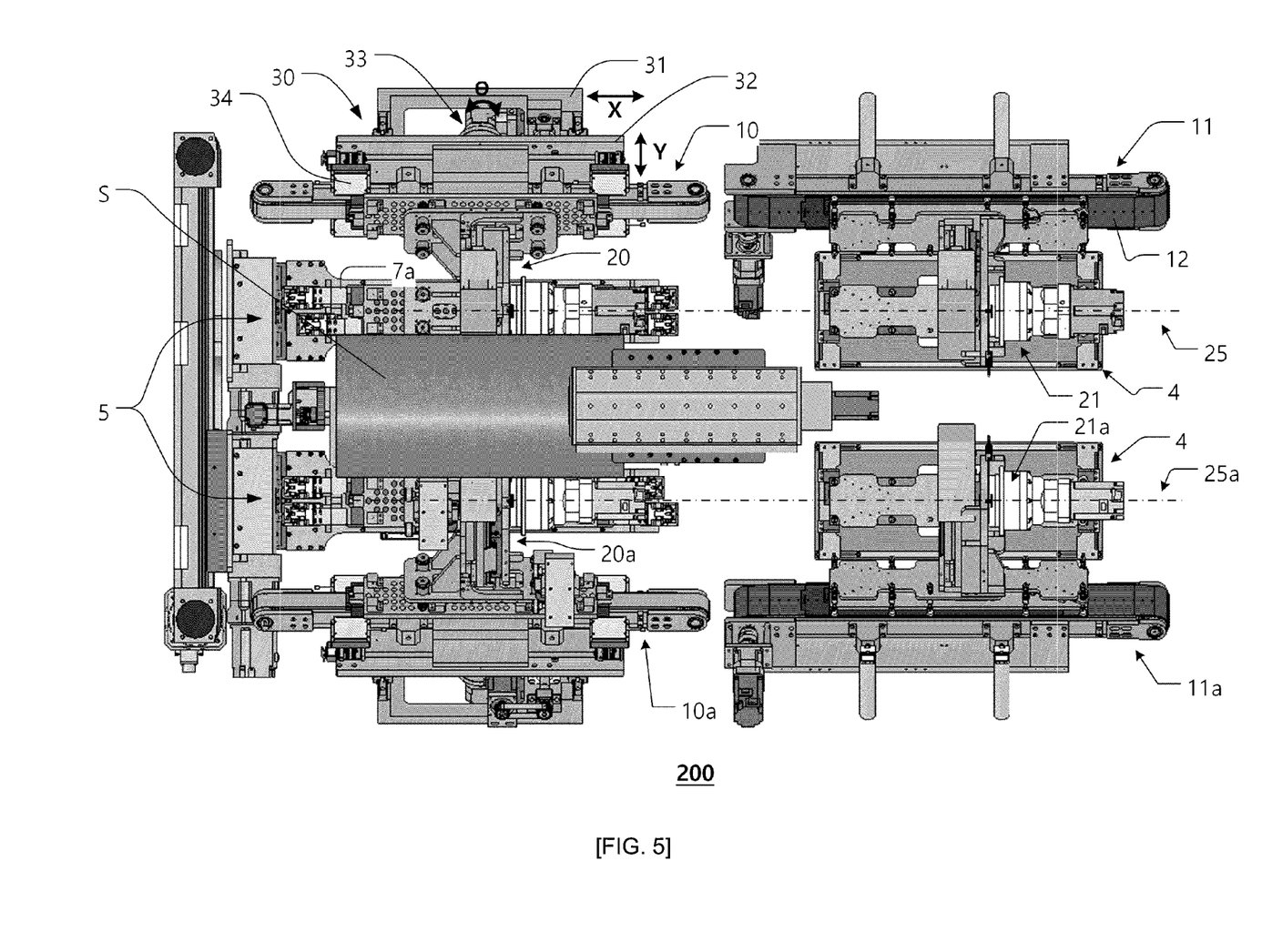
FIG. 5 is a plan view of an electrode plate stacking apparatus according to another embodiment of the present invention.

FIG. 5 is a plan view of an electrode plate stacking apparatus 200 according to another embodiment of the present invention.

In FIG. 5, the electrode plate stacking apparatus 200 includes a plurality of vacuum belt conveyors 10, 11; 10a, 11a arranged above and below the separator S, respectively, along the transfer lines for the negative electrode plate 1 and the positive electrode plate 2. It is different from the embodiment shown in FIG. 1 that a plurality of vacuum belt conveyors are provided for each transfer line.

The first vacuum belt conveyor 10 and the second vacuum belt conveyor 11 are arranged in a line along the positive electrode plate 2 transfer line, and the first vacuum belt conveyor 10a and the second vacuum belt conveyor 11a are arranged in a line along the negative electrode plate 1 transfer line. In FIG. 5, the first vacuum belt conveyors 10 and 10a are shown without a belt mounted.

The stack base 5 reciprocates between a negative electrode plate stacking position and a positive electrode plate stacking position, as in FIG. 1, and is shown in both stacking positions for ease of understanding. Stack grippers 6a, 6b, 7a, 7b are arranged at four edges of the stack base 5 to fix the electrode plate on the stack base.

The electrode plates 1, 2 are conveyed by the vacuum belt conveyors 10, 11; 10a, 11a from right to left in FIG. 5. Specifically, the electrode plates are loaded from the magazine 4 onto the vacuum belt conveyors 11, 11a by the second swing units 21, 21a, transferred to the vacuum belt conveyors 10, 10a along the transfer lines, and then stacked on the stack base 5 by the first swing units 20, 20a.

Hereinafter, the operation of the electrode plate stacking apparatus 100, 200 according to embodiments of the present invention will be described.

Figure 4:
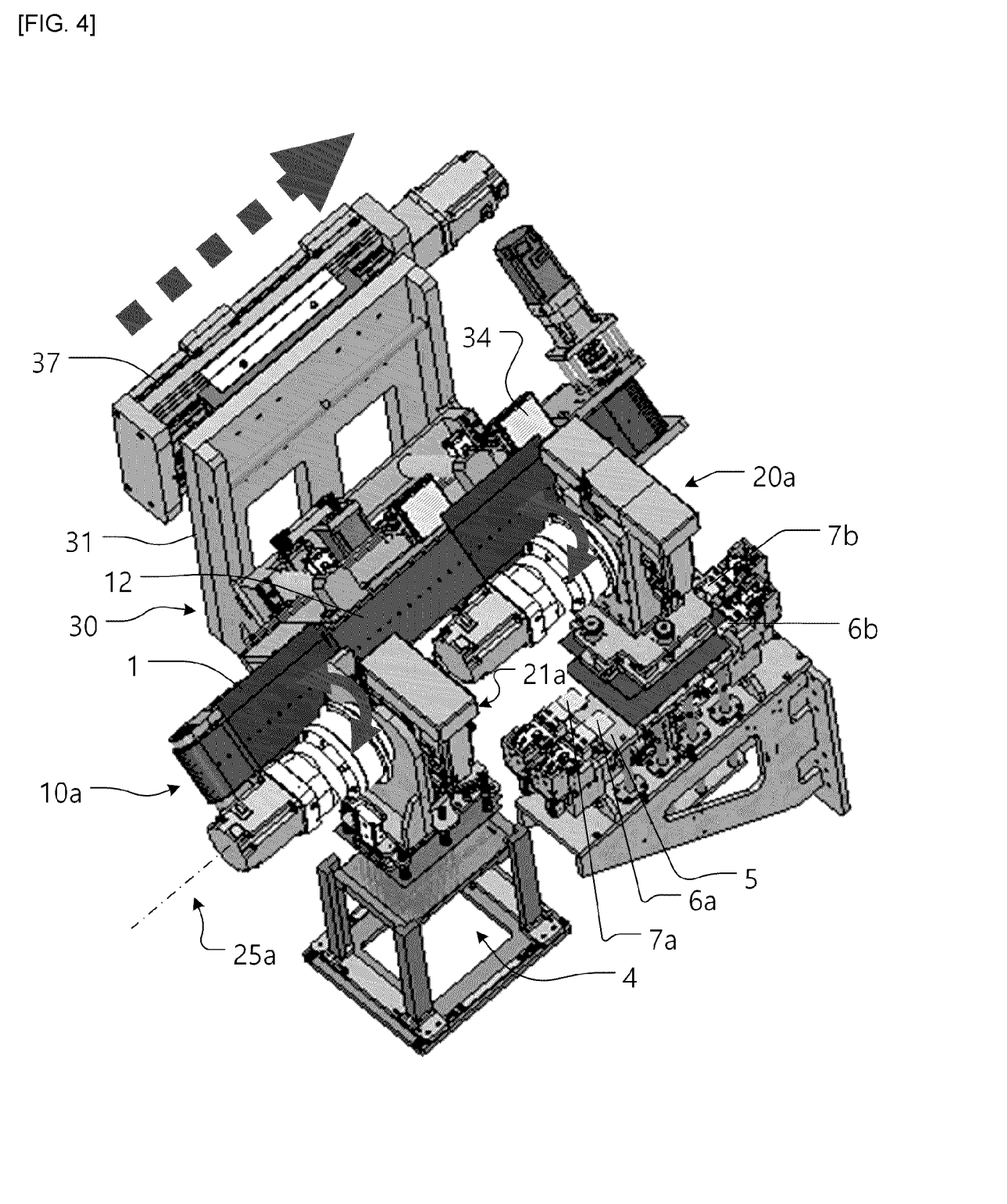
FIG. 4 is a perspective view of a vacuum belt conveyor and a swing unit cooperating with an electrode plate alignment module according to an embodiment of the present invention.

Referring to FIG. 4, which shows a single vacuum belt conveyor 10a, the electrode plate 1 is picked up from the magazine 4 by the second swing unit 21a and loaded onto the belt surface 12 of the vacuum belt conveyor 10a. At this time, the suction pad of the second swing unit 21a is extended into the magazine 4 by a z-axis (i.e. vertical) actuator, picks up an electrode plate 1 with a vacuum suction force, and is retracted back by the vertical actuator. Then, the suction pad faces parallel to the belt surface 12 of the vacuum conveyor 10a by a swing motion. After that, the suction pad of the second swing unit 21a extends towards the belt surface 12 to load the electrode plate 1 onto the belt surface 12.

Since the suction pad 22, 23 and the belt surface 12 can draw the electrode plates with a vacuum suction force, the electrode plate transfer between them can be achieved by controlling the strength of each suction force, cutting the suction force, or by an air blowing. For example, the electrode plate attached to the suction pad 22, 23 can be loaded onto the belt surface by blowing air through the holes (not shown) of the suction pad, while maintaining the suction force applied to the belt surface 12.

Contrarily, when the electrode plate is to be taken from the belt surface 12 to the suction pad 22, 23, the electrode plate can be transferred by simply approaching the suction pad 22, 23 to the belt surface 12 while maintaining the suction force on the belt surface 12 since the suction force on the suction pad 22, 23 is generally stronger. During this process, the belt can be stopped.

Thereafter, the belt runs in the conveying direction (in FIG. 4, the conveying direction is indicated by a dotted arrow. For reference, it is shown in the opposite direction to FIG. 1), and stops at the facing position with the first swing unit 20a. Alignment of the electrode plate 1 is performed at this position. It is checked whether the electrode plate is in the correct position by using the electrode plate position recognition module including the backlight 34 and the camera 35 (see FIG. 3), and if it is not in the correct position, the electrode plate 1 is aligned to the correct position by adjusting the position of the vacuum belt conveyor 10a using the XYθ moving module described above. When the electrode plate 1 is confirmed to be in the correct position according to the position adjustment, the electrode plate 1 is picked up (unloaded) by the first swing unit 20a.

Specifically, the electrode plate 1 is picked up while the suction pad of the first swing unit 20a faces the belt surface 12, swung to face the stack base 5 by a swing motion, and placed on the stack base 5. Thereafter, the stack grippers 6a, 6b, 7a, and 7b fix the electrode plate, for example, a negative electrode plate on the stack base 5. The stack base 5, then, moves to the stacking position of the other electrode plate, for example, a positive electrode plate.

Figure 6:
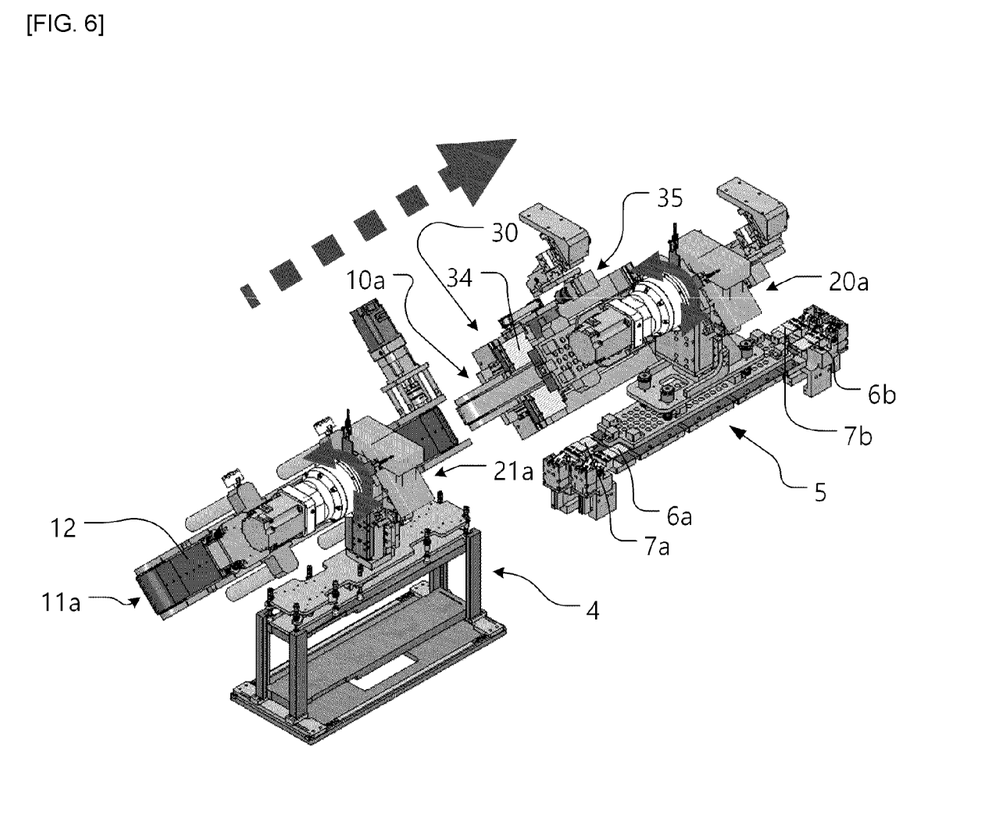
FIG. 6 is a perspective view of a vacuum belt conveyor and a swing unit cooperating with an electrode plate alignment module according to another embodiment of the present invention.

Referring to FIG. 6 showing a plurality of vacuum belt conveyors 10a and 11a, the vacuum belt conveyor 11a is arranged near the magazine 4, and the vacuum belt conveyor 10a is arranged near the stack base 5. The vacuum belt conveyor 10a is shown without a belt mounted. The electrode plate is transferred from the magazine 4 to the vacuum conveyor 11a by the second swing unit 21a, and then transferred to the facing position with the stack base 5 by the orbital movement of the vacuum conveyors 10a, 11a. Thereafter, the electrode plate is stacked on the stack base 5 by the first swing unit 20a.

Now, a U-shaped movement method of the stack base 5 that can be used in the present invention will be described with reference to FIGS. 7 to 9.

In FIG. 7(a), the stack base 5 is located at the upper right of the drawing, which captures the position at which one of the positive electrode plate and the negative electrode plate is just stacked on the separator S. When the electrode plate is placed on the stack base 5, the stack gripper 7a grips the electrode plate and the separator thereunder altogether. Since a horizontal movement mechanism 50 can be operated for the horizontal movement of the stack base 5, and an actuator 40 can be operated for the vertical movement of the stack base 5, the combined operation can make a movement of the stack base 5 in a U-shaped or lower semicircular trajectory, as marked by the arrows in the drawings. Such a combined operation can be implemented using PC control or PLC control. FIG. 7(b) shows the stack base 5 located to the left and in a lowered position, and FIG. 7(c) shows the stack base 5 located to further left and in a raised position. In this manner, the stack base 5 can be moved in the U-shaped or lower semicircular trajectory in an electrode plate stacking unit.

Alternatively, the U-shaped or lower semicircular movement of the stack base 5 may be implemented using a cam unit (not shown). For example, it is possible to provide a cam unit including a plate-shaped cam driving body and a following body linked to the cam driving body and moved in accordance with a rotating or reciprocating movement of the cam driving body. The stack base 5 may move in the U-shaped or lower semicircular trajectory by being coupled directly or indirectly to the following body.

One more layer of the separator is stacked by the movement according to FIGS. 7(a) to (c), and after reaching the position of FIG. 7(c), the remaining one of the two kinds of electrode plates is stacked on the separator. Then, the stack gripper 6a grips the electrode plate and the separator thereunder. Next, it moves along the U-shaped or lower semicircular trajectory in the opposite direction, that is, from FIG. 7(c) through (b) to (a).

Figure 7:
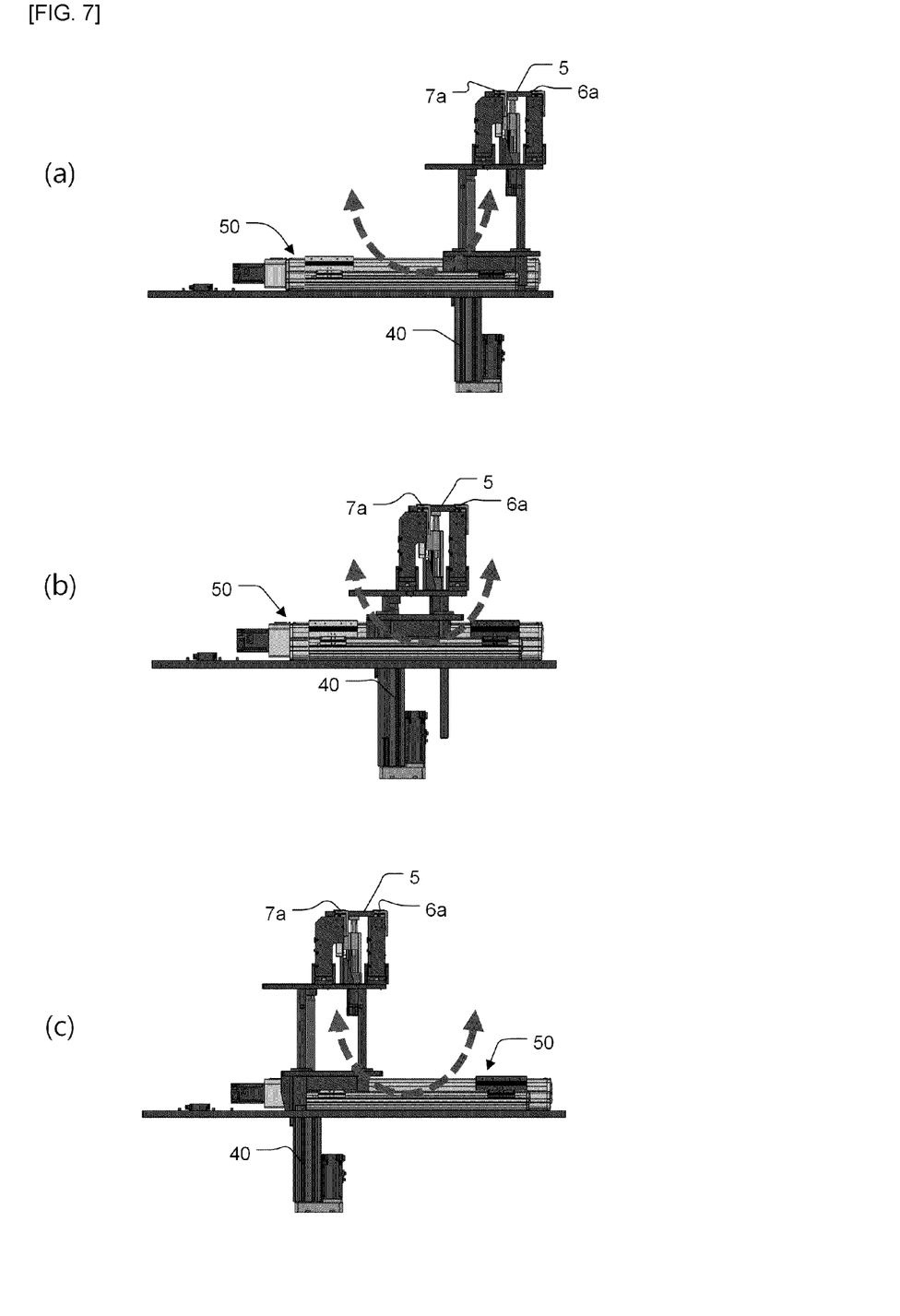
FIG. 7 shows a trajectory in which the stack base moves according to an embodiment of the present invention.
Figure 8:
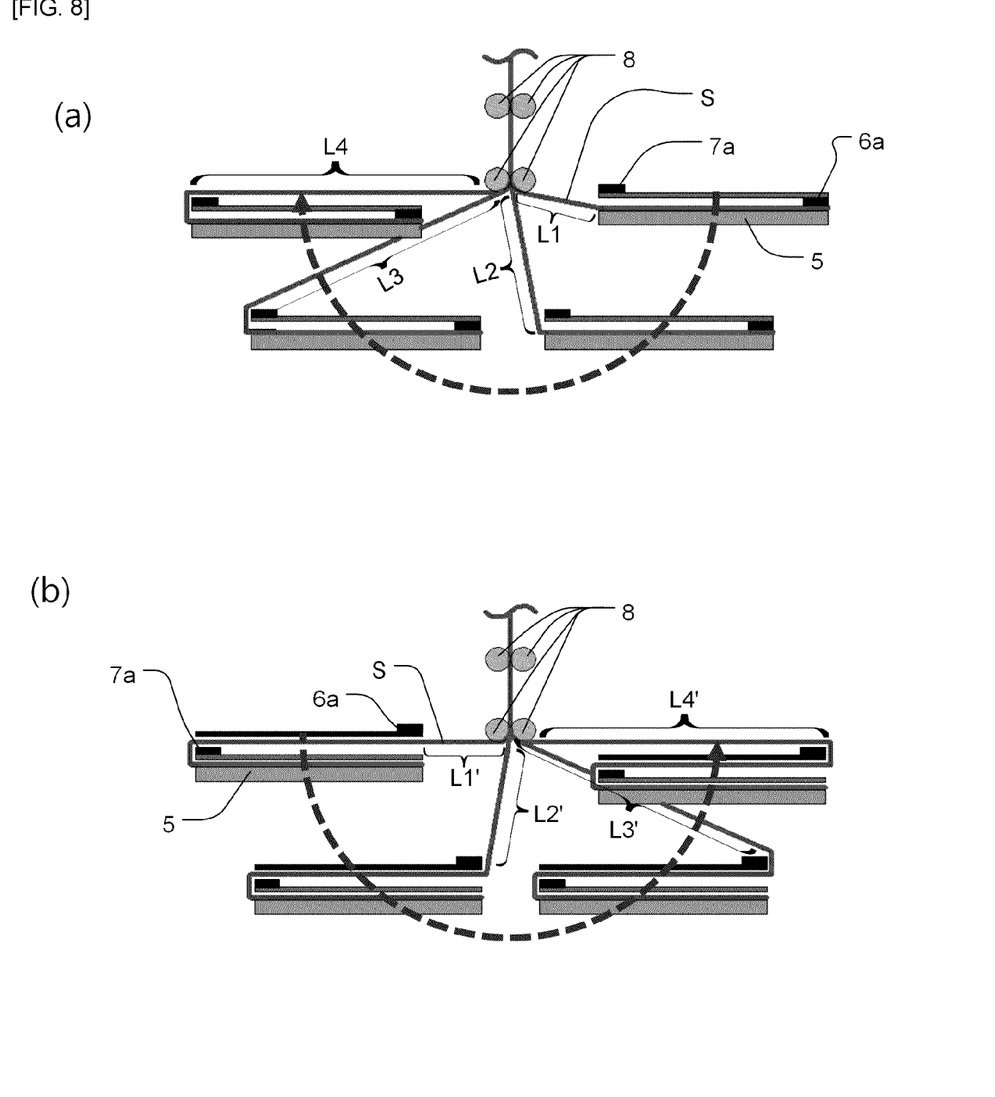
FIG. 8 schematically illustrates a stack base reciprocating between two electrode plate feeding positions according to an embodiment of the present invention.

FIG. 8 conceptually illustrate the movement of the stack base 5 shown in FIG. 7. Referring to (a) of FIG. 8, a process of moving the stack base 5 from a right side to a left side in a U-shaped or lower semicircular trajectory is shown in one view. It is important here that the separator S is not fed back during this movement of the lower semicircular trajectory. In other words, the portion of the separator S corresponding to the length from the roller located at the lowermost position among the guide rollers 8 (hereinafter referred to as 'end roller') to the point gripped by the stack gripper 7a will increase gradually as L1-L2-L3-L4. In this way, since the separator is only released (i.e. unwound) without being wound back in the reverse direction, the path along which the separator is released is kept constant without being shaken, and there is no need to realign the position of the separator. Therefore, the stack base 5 can continuously be moved without waiting for realignment, and its moving speed can be increased to the maximum performance of the equipment.

Additional configurations may be added to further increase the stability of such a semicircular or U-shaped movement of the stack base. For example, if a powder clutch (not shown) employed to maintain the tension of the separator is malfunctioning, the separator may not be released at a desired speed or may run back. In order to prevent the risk of unexpected malfunction including this, or to prepare for a case in which the release of the separator is not performed as desired by any other factors, a sensor (not shown) for detecting the running direction and/or speed of the separator can be installed. Such a sensor may be installed near the end rollers or in other suitable locations. By inputting of the detection result by the sensor as a feedback to a control unit for controlling the operation of the actuator 40 and the horizontal movement mechanism 50, it will be possible to control the separator to be released in the desired running direction and speed. It is also possible to monitor the release of the separator in a manner other than the sensor, for example, by sensing the rotational direction and speed of the guide rollers 8 including the end roller or any other roller. Based on this monitoring information, the moving speed of the stack base may be adjusted, thereby preventing the back-feed of the separator and releasing the separator at a desired speed.

In (b) of FIG. 8, which shows the movement of the lower semicircular trajectory of the stack base 5 in the opposite direction to that in (a) of FIG. 8, similarly, the portion of the separator S gradually increases as L1'-L2'-L3'-L4' during the movement of the stack base 5.

Figure 9:
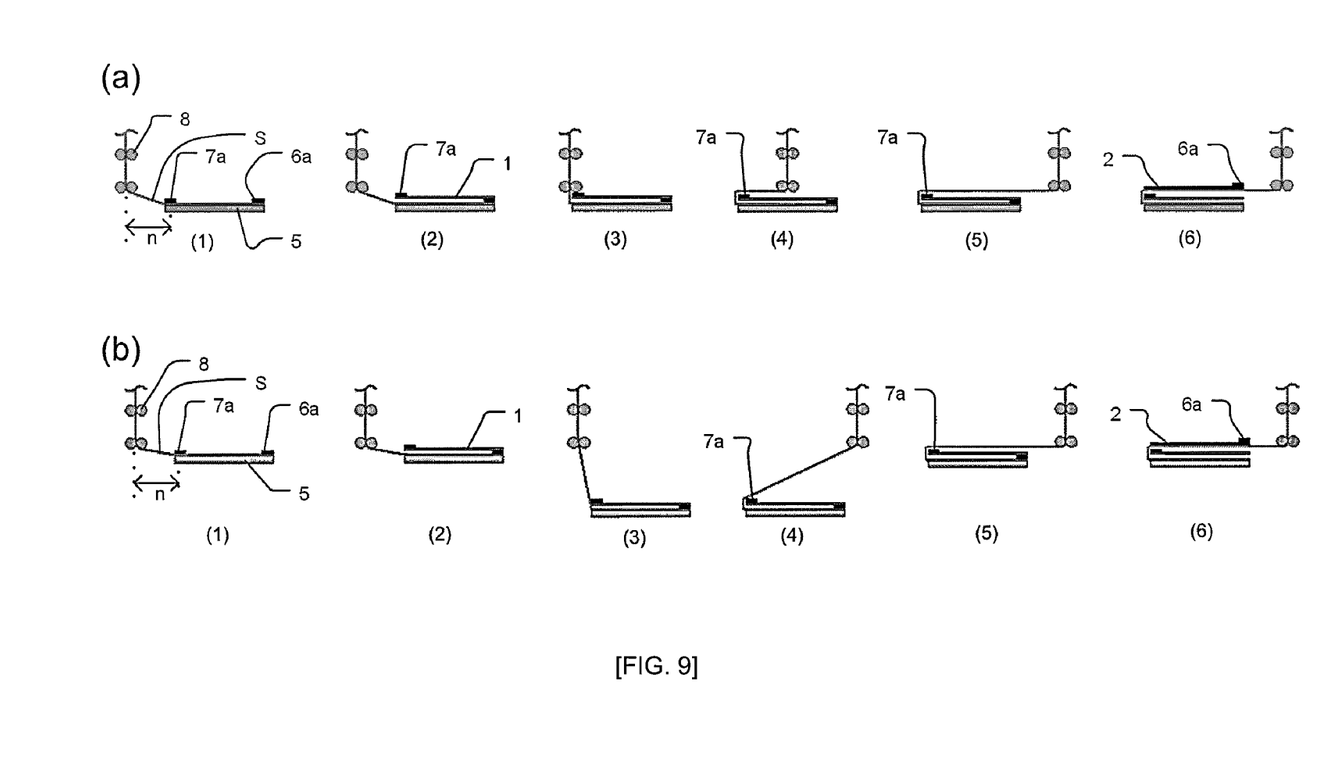
FIG. 9 is a conceptual diagram sequentially showing a movement path of a stack base according to an embodiment of the present invention.

In FIG. 9, (a) sequentially illustrates the horizontal movement path of the stack base, and (b) sequentially illustrates the movement path of the stack base in a U-shaped or lower semicircular trajectory according to the present invention.

Referring to (b) showing the movement path of the stack base according to the present invention, going from step (1) to step (2), the electrode plate 1 was stacked, the stack gripper 7a moved in over the electrode plate 1 and gripped it. Then, the stack base 5 was moved in a semi-circular or U-shaped trajectory from step (3) to step (5), and in step (6), the other electrode plate 2 was stacked and gripped by the stack gripper 6a.

Comparing the steps (3) through (5) in the movement path (b) with those in the path (a) showing a horizontal trajectory, it can be seen that less force is applied to the separator S by the gripper 7a in the movement path (b) compared to the corresponding force in the movement path (a). Referring to the step (4), in the movement path (a), the force exerted by the stack gripper 7a in the acceleration direction (that is, to the left side) is fully transmitted to the separator S, whereas in the movement path (b), the force due to the stack gripper 7a in the acceleration direction (i.e., slantingly) is only partially transmitted to the separator S. Furthermore, when the step (5) is compared, in the movement path (a) the blade-like side of the stack gripper 7a exerts a force on the narrow area of the separator S since the acceleration direction is left, while in the movement path (b), the surface of the stack gripper 7a exerts a force on a relatively large area of the separator S since the acceleration direction is upward.

Therefore, the risk of damage to the separator S is significantly lowered by employing a semi-circular or U-shaped movement of the stack base according to the present invention.

As described above, according to the stack manufacturing apparatus of the present invention, it is possible to move the electrode plate more quickly, and the stacking speed of the electrode plate can be maximized. This may bring a significant productivity improvement in the manufacturing field of the prismatic secondary batteries.

In the above, certain preferred embodiments of the present invention have been illustrated and described. However, the present invention is not limited to the above-described embodiments, and various modifications may be made by any person having ordinary skill in the art to which the present invention pertains without departing from the gist and spirit of the present invention as claimed in the claims.

| Explanation of reference numbers | |
|---|---|
| 1: negative electrode plate | 2: positive electrode plate |
| S: separator | 4, 4a: magazine |
| 5: stack base | 6a, 6b, 7a, 7b: stack gripper |
| 10, 10a, 11, 11a: vacuum belt conveyor | |
| 12: belt surface | 13: vacuum hole |
| 20, 20a: first swing unit | 21, 21a: second swing unit |
| 22, 23: suction pad | 25, 25a: swing axis |
| 30: electrode plate alignment unit | 31: support frame |
| 32: support plate | 33: shaft |
| 34: backlight | 35, 35a: camera |

What is claimed is:

1. An electrode plate stacking apparatus for a prismatic secondary battery, wherein a positive electrode plate and a negative electrode plate are supplied alternately on a stack base and a separator is provided during an electrode plate stacking process between the positive electrode plate and the negative electrode plate, and wherein the stack base is configured to reciprocate between a stack position of the positive electrode plate and a stack position of the negative electrode plate, the apparatus comprising:
   a vacuum belt conveyor for moving electrode plates along a transfer line;
   a first swing unit capable of conducting swing motion about an axis parallel to a horizontal plane, configured to unload an electrode plate directly from the vacuum belt conveyor and load it onto the stack base, wherein the vacuum belt conveyor is configured to be inclined with respect to the horizontal plane to allow the first swing unit to load or unload the electrode plate at both ends of the swing motion; and
   an electrode plate alignment unit configured to align an electrode plate on the vacuum belt conveyor by adjusting position of a belt surface of the vacuum belt conveyor holding the electrode plate.

2. The electrode plate stacking apparatus according to claim 1, wherein the apparatus further comprises a second swing unit capable of conducting swing motion about an axis that is the same or parallel to the axis of the first swing unit, and wherein the second swing unit is configured to unload an electrode plate from an electrode plate magazine and load it onto the vacuum belt conveyor.

3. The electrode plate stacking apparatus according to claim 1, wherein the electrode plate alignment unit includes an XYθ-moving module configured to adjust the position of the belt surface of the vacuum belt conveyor.

4. The electrode plate stacking apparatus according to claim 3, wherein the electrode plate alignment unit includes an electrode plate position recognition module.

5. The electrode plate stacking apparatus according to claim 2, wherein the vacuum belt conveyor includes a first vacuum belt conveyor and a second vacuum belt conveyor arranged in a line along the transfer line, the first swing unit being capable of conducting swing motion between the first vacuum belt conveyor and the stack base, the second swing unit being capable of conducting swing motion between the second vacuum conveyor and the magazine.

6. The electrode plate stacking apparatus according to claim 5, wherein both of the first and second belt conveyors repeat a transfer operation and a subsequent stop operation, and are operable in synchronization with each other.

7. The electrode plate stacking apparatus according to claim 1, wherein the apparatus further comprises a moving means for moving the stack base, and wherein the moving means is capable of moving the stack base in a U-shaped or lower semicircular trajectory between the stack position of the positive electrode plate and the stack position of negative electrode plate.

* * * * *